US008972309B2

United States Patent
Takahashi

(10) Patent No.: US 8,972,309 B2
(45) Date of Patent: Mar. 3, 2015

(54) AUTOMATIC UPDATING APPARATUS, AUTOMATIC UPDATING METHOD, AND PROGRAMMABLE STORAGE MEDIUM EMBODYING PROGRAM TO PERFORM METHOD FOR AUTOMATIC UPDATING

(75) Inventor: Hiromichi Takahashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 567 days.

(21) Appl. No.: 13/345,458

(22) Filed: Jan. 6, 2012

(65) Prior Publication Data

US 2012/0110505 A1     May 3, 2012

Related U.S. Application Data

(63) Continuation of application No. 12/453,607, filed on May 15, 2009.

(30) Foreign Application Priority Data

May 22, 2008    (JP) ................................ 2008-133882

(51) Int. Cl.
    *G06F 15/18*      (2006.01)
    *G06Q 30/00*      (2012.01)
    *G06F 17/30*      (2006.01)

(52) U.S. Cl.
    CPC ......... *G06F 17/3089* (2013.01); *Y10S 706/902* (2013.01); *Y10S 706/934* (2013.01)
    USPC ............. 706/12; 706/902; 706/934; 715/221; 715/226; 715/231; 705/27.1

(58) Field of Classification Search
    USPC ......................................................... 706/12
    See application file for complete search history.

(56) References Cited

U.S. PATENT DOCUMENTS 7,310,632 B2     12/2007    Meek et al.

FOREIGN PATENT DOCUMENTS

| JP | 2000-293423 (A) | 10/2000 |
| JP | 2002-342369 (A) | 11/2002 |
| JP | 2003-6224 (A)   | 1/2003  |
| JP | 2003-150770 (A) | 5/2003  |
| JP | 2006-209598 (A) | 8/2006  |
| JP | 2006-323629 (A) | 11/2006 |

OTHER PUBLICATIONS

Gagliardo et al., Endian Firewall Administrative Guide [online], 2006 [retrieved on Jul. 14, 2014].Retrieved from the Internet: <URL:http://www.google.com/url?sa=t&rct=j&q=&esrc=s&frm=1 &source=web&cd=28&ved=0CE8QFjAHOBQ &url=http%3A%2F%2Fwww.endian. com%2Ffileadmin%2Fdocumentation%2Fefw-admin-guide%2Fen%2Fefw-admin-guide.html&ei=ynHDU7WePLG-sQSW-4HwBg>.*

Notification of Reason(s) for Refusal dated Apr. 26, 2012, with partial English translation.

* cited by examiner

*Primary Examiner* — Jeffrey A Gaffin
*Assistant Examiner* — Nathan Brown, Jr.
(74) *Attorney, Agent, or Firm* — McGinn IP Law Group, PLLC

(57) ABSTRACT

An automatic updating apparatus includes a traffic receiver that receives numbers per unit time of the access of more than one menu displayed in a screen and calculates rates of variability with respect to the numbers of the access to each menu, and a menu updating unit that updates a menu display in the screen based on the rates of variability.

7 Claims, 15 Drawing Sheets

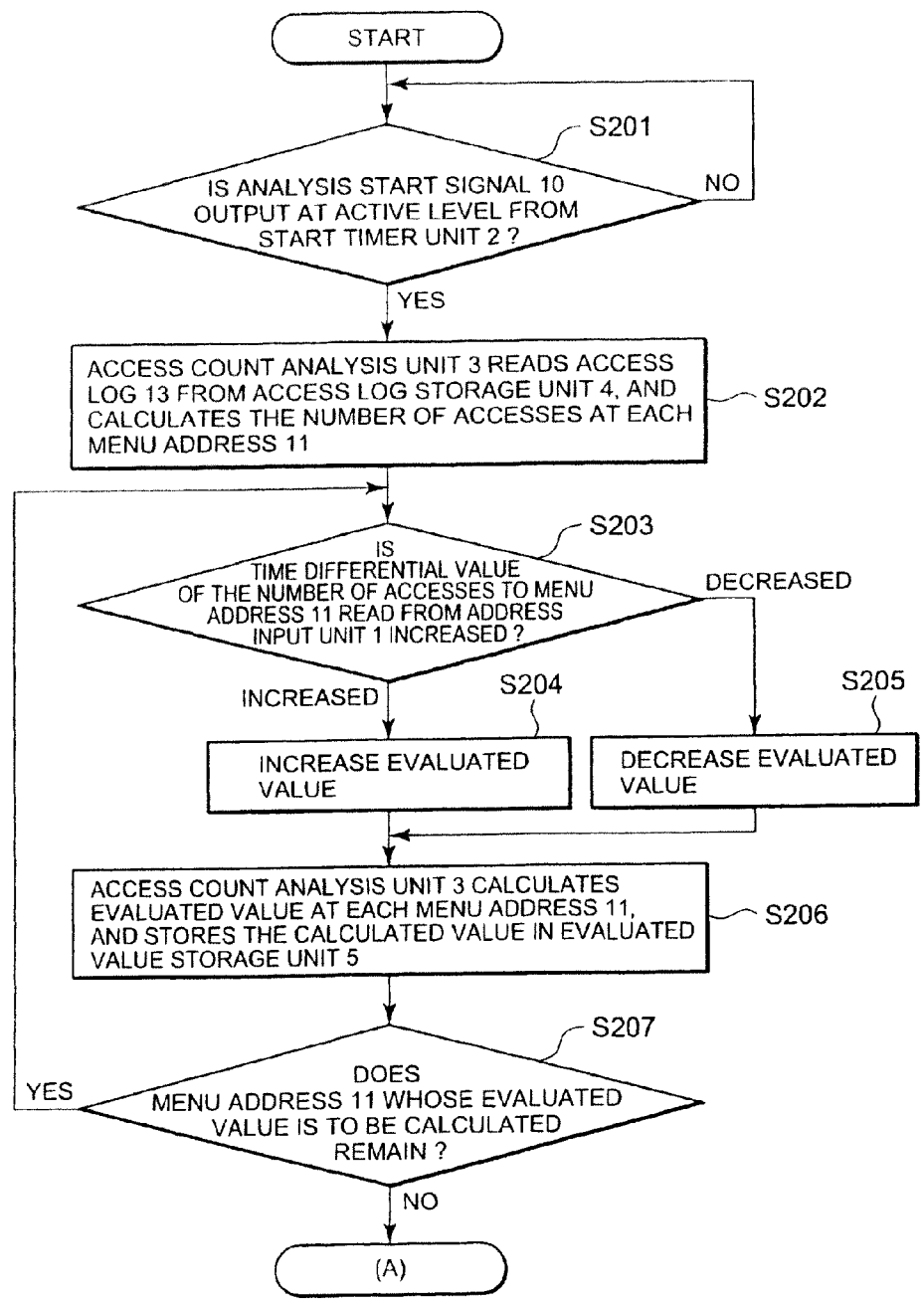

Fig. 6

GENERAL-PURPOSE MICROCOMPUTER
8-BIT 78KOS MICROCOMPUTER

78KOS/KU1+
78KOS/KY1+
78KOS/KA1+
78KOS/KB1+
μPD78902x
μPD78904x
μPD78905x
μPD78906x
μPD78907x
μPD78908x
μPD78910xA
μPD78911xA
μPD78912xA
μPD78913xA
μPD78916x
μPD78917x

```
<table>
<tr>
<td>,a href="78kosku1plus.html">78KOS/KU1+</a></td>
<td>,a href="78kosky1plus.html">78KOS/KY1+</a></td>
<td>,a href="78koska1plus.html">78KOS/KA1+</a></td>
<td>,a href="78koskb1plus.html">78KOS/KB1+</a></td>
.....
<td>,a href="789177.html">UPD78917x</a></td>
</tr>
</table>
```

Fig. 7

(T2-T1) = (T3-T2) = 1 HOUR, AND THE NUMBER OF ACCESSES AT T3 SHALL BE
(THE NUMBER OF ACCESSES AT TIME POINT T2) + (DIFFERENCE IN THE NUMBER OF ACCESSES OF (T2-T1))

| GENERAL-PURPOSE MICROCOMPUTER 8-BIT 78K0S MICROCOMPUTER | THE NUMBER OF ACCESSES AT T1 | THE NUMBER OF ACCESSES AT T2 | THE NUMBER OF ACCESSES AT T3 |
|---|---|---|---|
| 78K0S/KU1+ | 400 | 450 | 500 |
| 78K0S/KY1+ | 200 | 400 | 600 |
| 78K0S/KA1+ | 150 | 140 | 130 |
| 78K0S/KB1+ | 100 | 120 | 140 |
| μPD78902x | ... | ... | ... |
| μPD78904x | | | |
| μPD78905x | | | |
| μPD78906x | | | |
| μPD78907x | | | |
| μPD78908x | | | |
| μPD78910xA | | | |
| μPD78911xA | | | |
| μPD78912xA | | | |
| μPD78913xA | | | |
| μPD78916x | | | |
| μPD78917x | 0 | 0 | 0 |

Fig. 8

GENERAL-PURPOSE MICROCOMPUTER
8-BIT 78KOS MICROCOMPUTER

78KOS/KY1+  ⎫ REPLACED
78KOS/KU1+  ⎭
78KOS/KB1+  ⎫ REPLACED
78KOS/KA1+  ⎭
μPD78902x
μPD78904x
μPD78905x
μPD78906x
μPD78907x
μPD78908x
μPD78910xA
μPD78911xA
μPD78912xA
μPD78913xA
μPD78916x
μPD78917x

<table>
<tr>
<td>,a href="78kosky1plus.html">78KOS/KY1+</a></td> ⎫ REPLACED
<td>,a href="78kosku1plus.html">78KOS/KU1+</a></td> ⎭
<td>,a href="78koskb1plus.html">78KOS/KB1+</a></td> ⎫ REPLACED
<td>,a href="78koska1plus.html">78KOS/KA1+</a></td> ⎭
......
<td>,a href="78917.html">UPD789177x</a></td>
</tr>
</table>

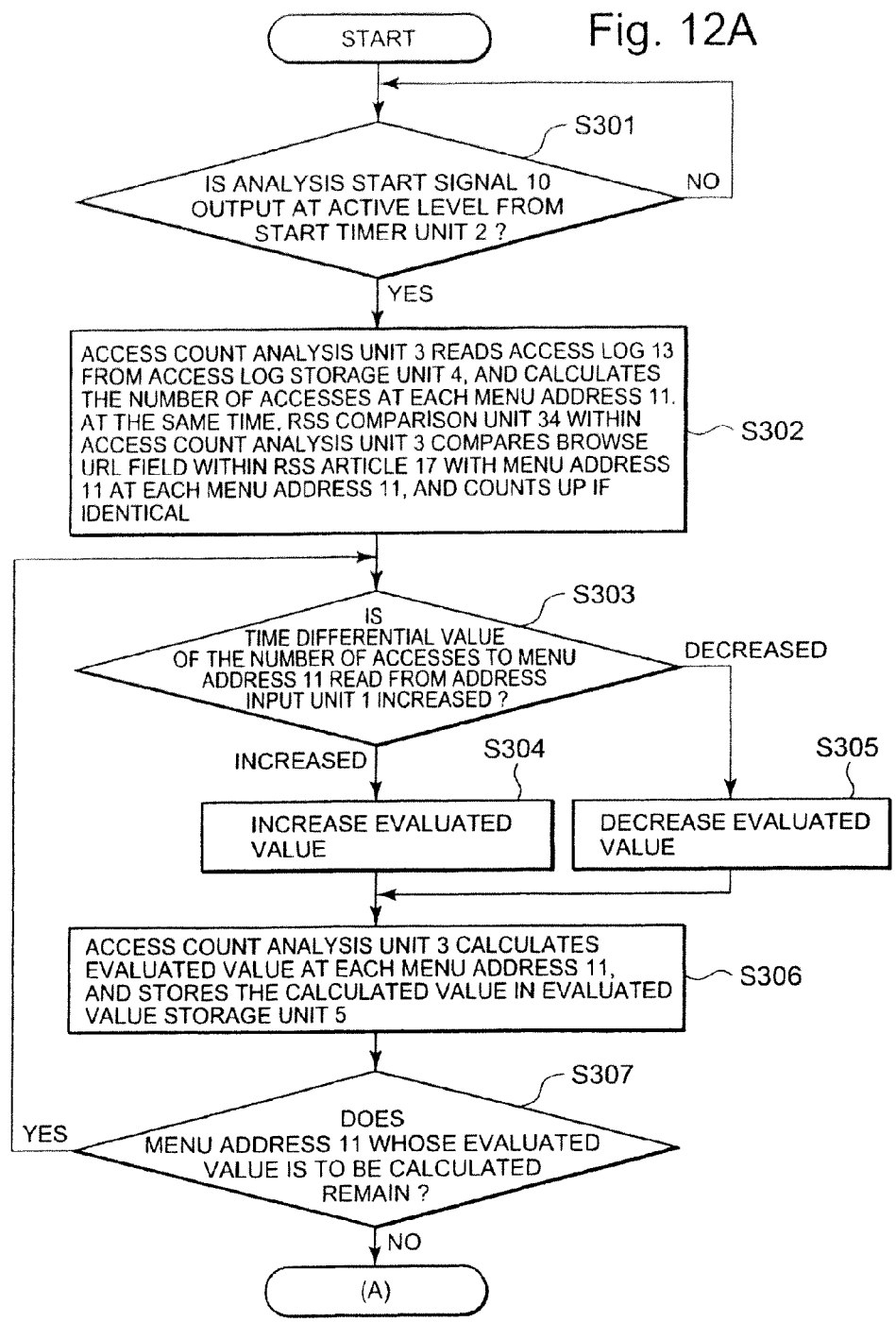

Fig. 13

(T2-T1) = (T3-T2) = 1 HOUR, AND THE NUMBER OF ACCESSES AT T3 SHALL BE
(THE NUMBER OF ACCESSES AT TIME POINT T2) + (DIFFERENCE IN THE NUMBER OF ACCESSES OF (T2-T1))

| GENERAL-PURPOSE MICROCOMPUTER 8-BIT 78KOS MICROCOMPUTER | THE NUMBER OF ACCESSES AT T1 | THE NUMBER OF ACCESSES AT T2 | THE NUMBER OF ACCESSES AT T3 |
|---|---|---|---|
| 78KOS/KU1+ | 400 | 450 | 500 |
| 78KOS/KY1+ | 200 | 300 | 400 |
| 78KOS/KA1+ | 150 | 140 | 130 |
| 78KOS/KB1+ | 100 | 120 | 140 |
| μPD78902x | | | |
| μPD78904x | | | |
| μPD78905x | | | |
| μPD78906x | | | |
| μPD78907x | | | |
| μPD78908x | | | |
| μPD78910xA | | | |
| μPD78911xA | | | |
| μPD78912xA | | | |
| μPD78913xA | | | |
| μPD78916x | | | |
| μPD78917x | 0 | 0 | 0 |

THE NUMBER OF ARTICLES OF RSS READER OF 78KOS/KU1+ AT TIME POINT T2 IS 10.
THE NUMBER OF ARTICLES OF RSS READER OF 78KOS/KY1+ IS 100, AND
THE NUMBER OF ARTICLES OF RSS READER IS ADDED TO EVALUATED VALUE

AUTOMATIC UPDATING APPARATUS, AUTOMATIC UPDATING METHOD, AND PROGRAMMABLE STORAGE MEDIUM EMBODYING PROGRAM TO PERFORM METHOD FOR AUTOMATIC UPDATING

INCORPORATION BY REFERENCE

The present application is a Continuation Application of U.S. patent application Ser. No. 12/953,607, filed on May 15, 2009, which is based on Japanese patent application No. 2008-133882, filed on May 22, 2008, the entire contents of which is incorporated herein by reference.

BACKGROUND OF THE INVENTION

1. Field of the Invention

The present invention relates to an automatic updating apparatus, an automatic updating method and a programmable storage medium embodying a program to perform a method for automatic updating and particularly to an automatic updating apparatus, an automatic updating method and a programmable storage medium embodying a program to perform a method of automatic updating of a web page.

2. Description of Related Art

It is preferable that menus of web pages for enterprises or the like are arranged based on a number of accesses from audiences. That is, it is necessary to highlight a display item that is frequently accessed among display items of the menus. Also, there is required to realize highlighting of the display item frequently accessed as soon as possible.

Because a frequency at which each of the display items of the menus on the web page is accessed from the audience changes momentarily, it is preferable to vary the display order of the display items in quick response to the change.

As a related art, a home page menu updating apparatus is disclosed in JP-A-2000-293423.

In JP-A-2000-293423, a user modifies the order of menu items and a character attribute for highlighting of the item according to the number of accesses or the priority by analyzing the access log when the user accesses to the home page or setting the priority of the menu items, and automatically updates the menus of the home page so as to always provide an optimum menu.

Also, JP-A-2003-006224 discloses an automatic updating method and an automatic updating apparatus for a WWW page.

In JP-A-2003-006224, a WWW page browsed over a communication network is provided for each of the audiences, and each WWW page is automatically updated according to the access mode of each audience.

Further, JP-A-2006-323629 discloses a server, a web server, and a page updating method which analyze information for updating a page of a web server.

In JP-A-2006-323629, an access log Data Base (DB) records an access time, a number of accesses, a residence time, or the like from a user terminal in each of the web servers, and records a browsing action of the user based on the access log that has been recorded in the access log DB. A control unit executes a prediction based on a discrete choice model, and a prediction based on a co-occurrence frequency with the use of a search keyword according to the obtained browsing action.

Further, in the web page whose contents are frequently updated, it is necessary to grasp an update of the web page in order to grasp a factor causing a change in the number of accesses. In recent years, cases have increased in which Rich Site Summary (other names: Really Simple Syndication or RDF Site Summary, hereinafter called "RSS") is used for an update notification of the web page such as a "blog".

JP-A-2006-209598 discloses a site information collecting system.

In JP-A-2006-209598, a browse terminal acquires an RSS file from a distribution site by using an RSS reader, and when a Packet INternet Groper (PING) server transmission module exists in the RSS file, the browse terminal transmits a Uniform Resource Identifier (URI) of the RSS file which has been recorded in the PING server transmission module to a PING server designated in the PING server transmission module.

In all of the above, up to now, the display order of display items on the menus has been changed based on the magnitude of a value of the number of accesses from the audiences.

SUMMARY

However, there is no means for changing the display order of display items on the menus based on a change in the number of accesses and the variable ratio.

The present invention proposes a technique of automatically updating the menus of the web page over an Internet to an optimum menu with the use of an access log being within a web server. Specifically, the present invention is intended to automatically update the display items in the menus on the web page based on a variation in the number of accesses, respectively.

The present invention seeks to solve one or more of the above problems, or to improve upon those problems at least in part.

In one exemplary embodiment, an automatic updating apparatus according to the present invention includes a start instructing unit that outputs an analysis start signal at given intervals, an access count analysis unit that calculates an access count for each of menus indicated in a menu list on a network in response to the analysis start signal, calculates predictive evaluated values based on a variation in the access count within a unit time for each of the menus indicated in the menu list, and outputs a start signal unless the predictive evaluated values are arranged in order of the magnitude relation, and a menu updating unit that acquires the predictive evaluated values according to the start signal, and updates the contents of the menus indicated in the menu list according to the respective magnitude relations of the predictive evaluated values.

In another exemplary embodiment, an automatic updating method includes outputting an analysis start signal at given intervals, calculating an access count for each of menus indicated in a menu list on a network in response to the analysis start signal, calculating predictive evaluated values based on a variation in the access count within a unit time for each of the menus indicated in the menu list, and outputting a start signal unless the predictive evaluated values are arranged in order of the magnitude relation, and acquiring the predictive evaluated values according to the start signal, and updating the contents of the menus indicated in the menu list according to the respective magnitude relations of the predictive evaluated values.

In yet another exemplary embodiment, a programmable storage medium tangibly embodying a program of machine-readable instructions executable by a digital processing apparatus to perform a method for automatic updating, the method includes outputting an analysis start signal at given intervals, calculating an access count for each of menus indicated in a menu list on a network in response to the analysis start signal, calculating predictive evaluated values based on a variation in the access count within a unit time for each of the menus indicated in the menu list, and outputting a start signal unless the predictive evaluated values are arranged in order of the magnitude relation, and acquiring the predictive evaluated values according to the start signal, and updating the contents of the menus indicated in the menu list according to the respective magnitude relations of the predictive evaluated values.

Therefore, the menu update of the web page according to a change in the number of accesses per unit time can be automatically implemented.

BRIEF DESCRIPTION OF THE DRAWINGS

The above and other purposes, advantages and features of the present invention will become more apparent from the following description of certain exemplary embodiments taken in conjunction with the accompanying drawings in which:

FIG. 5A is a flowchart showing the operation of the access count analysis unit 3 in the first exemplary embodiment;

FIG. 6 is a diagram showing an example of menu that has not yet been changed at time point T2;

FIG. 7 is a diagram showing an example of calculating an evaluated value in the first exemplary embodiment;

FIG. 8 is a diagram showing an example of the menu that has been changed;

FIG. 12A is a flowchart showing the operation of the access count analysis unit 3 in the second exemplary embodiment;

FIG. 13 is a diagram showing an example of calculating an evaluated value in the second exemplary embodiment.

DETAILED DESCRIPTION OF THE EXEMPLARY EMBODIMENTS

The invention will now be described herein with reference to illustrative exemplary embodiments. Those skilled in the art will recognize that many alternative embodiments can be accomplished using the knowledge of the present invention, and that the invention is not limited to the exemplary embodiments illustrated for explanatory purposes.
First Exemplary Embodiment Hereinafter, a first exemplary embodiment of the present invention will be described with reference to the accompanying drawings.

Figure 1:
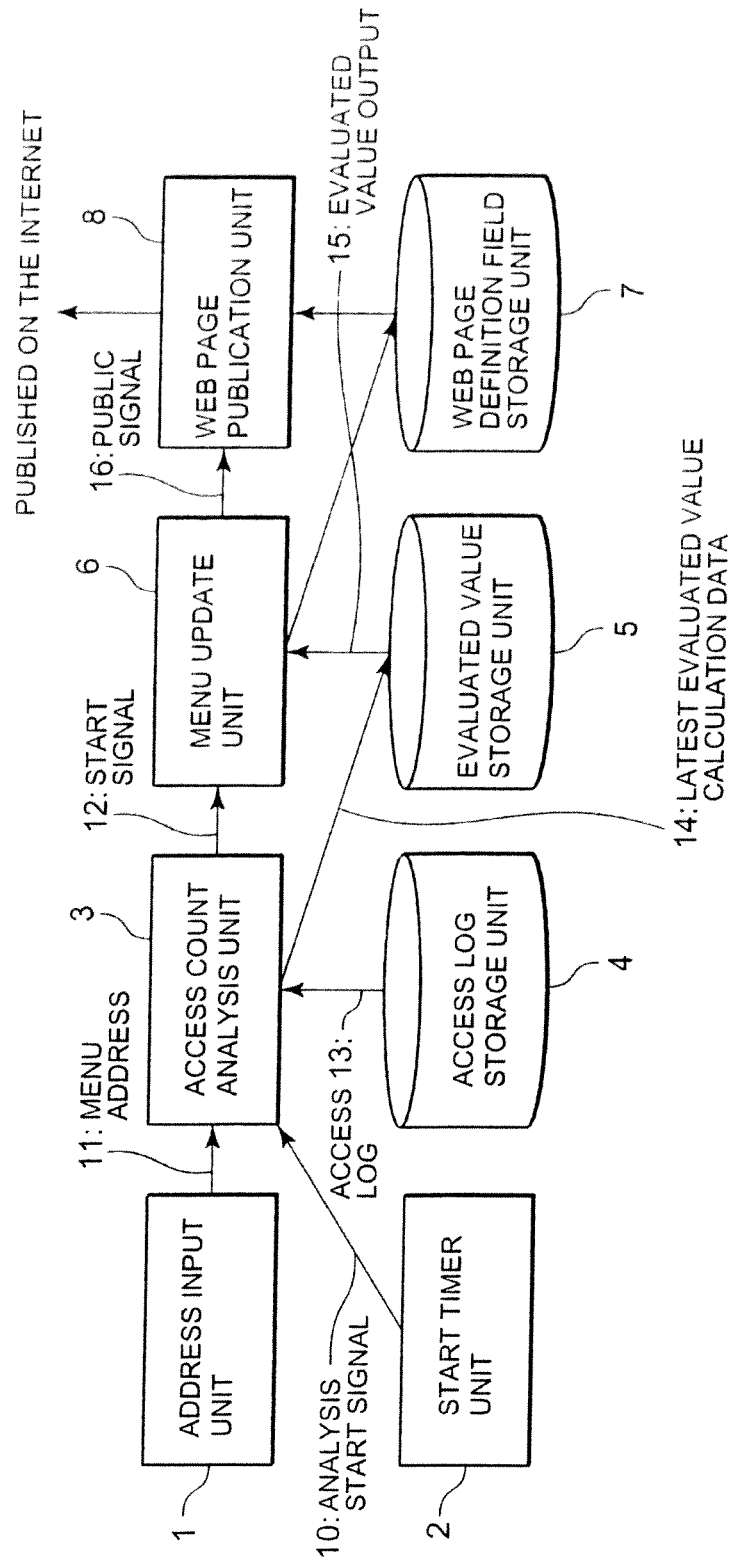
FIG. 1 is a block diagram showing a configuration example in a first exemplary embodiment of the present invention.

Referring to FIG. 1, an automatic updating apparatus according to the first exemplary embodiment includes an address input unit 1, a start timer unit 2, an access count analysis unit 3, an access log storage unit 4, an evaluated value storage unit 5, a menu update unit 6, a web page definition field storage unit 7, and a web page publication unit 8.

The address input unit 1 accepts an input of an address of a web page. For example, the address input unit 1 accepts the input of the address of a web page including a menu address 11 to be automatically updated. In this case, the menu address 11 is data indicative of an address of each menu indicated on the web page. The menu address 11 is frequently described in a source code of the web page. In this case, the address input unit 1 may acquire the menu address 11 based on the address of the web page. Alternatively, the address input unit 1 may directly accept the input of the menu address 11. Basically, it is assumed that the address input in the address input unit 1 is conducted in the same manner as that in JP-A-2000-293423. However, in fact, the present invention is not limited to those examples.

The address input unit 1 may output the address of a preset web page. At this time, the address input unit 1 may periodically circulate the subject web page based on the address of the preset web page, and automatically acquire the menu address 11 described in the source code of the subject web page. When target web pages are of plural number, and individual inputs of addresses are troublesome, the above operation is preferable.

Also, the address input unit 1 may automatically acquire the address input to an application enabling network such as a web browser. At this time, the address input unit 1 may automatically acquire the menu address 11 described in the source code of the subject web page with reference to the web page corresponding to an address input to the application.

The start timer unit 2 outputs an analysis start signal 10 at given intervals. The "given interval" is indicative of a unit time. In this example, the start timer unit 2 sets the analysis start signal 10 to "1", and outputs the signal every one hour. In this case, the unit time is one hour. In fact, the present invention is not limited to those examples. The analysis start signal 10 is a signal whose active level is "1". The active level is indicative of "effective".

Upon receiving the analysis start signal 10, the access count analysis unit 3 acquires the address of the web page, and calculates the number of accesses with reference to an access log 13 of the web page based on the acquired address. In this time, the access count analysis unit 3 may require the provision of the menu address 11 of the address input unit 1 according to the analysis start signal 10. For example, when the analysis start signal 10 becomes "1", the access count analysis unit 3 reads the menu address 11 from the address input unit 1, refers to the access log 13 corresponding to the menu address 11 from the access log storage unit 4, and counts the number of accesses.

The access count analysis unit 3 may acquire the address of the web page from the address input unit 1, refer to the web page corresponding to the acquired address, and automatically acquire the menu address 11 described in the source code of the subject web page.

Also, the access count analysis unit 3 predicts and calculates the evaluated value from a change in the number of accesses over time for every address. For example, the access count analysis unit 3 predicts and calculates the evaluated value from a change in the number of accesses over time for every menu address 11, outputs the predicted and calculated evaluated value as latest evaluated value calculation data 14, and stores the data in the evaluated value storage unit 5. The access count analysis unit 3 repeats the above processing until the subject menu address 11 is eliminated.

Besides, the access count analysis unit 3 outputs a start signal 12 when the respective magnitude relations of the predicted and calculated evaluated values change at the time of analysis. For example, the access count analysis unit 3 sets the start signal 12 to "1", and outputs the signal when the respective magnitude relations of the predicted and calculated evaluated values and the evaluated values stored in the evaluated value storage unit 5 are reversed, or the menu changes at the time of analysis. The start signal 12 is a signal whose value "1" is an active level.

At this time, the access count analysis unit 3 may initialize the access log storage unit 4 after having output the start signal 12, and erase all of the access logs 13 stored in the access log storage unit 4. That is, the access log storage unit 4 may store only the access log 13 within the unit time therein.

The access log storage unit 4 stores the access log 13 of the web page therein. The access log storage unit 4 may exist on the individual web servers that provide web pages. In this case, the access log storage unit 4 stores the access logs 13 of all of the web pages that can refer to the access log 13 with respect to the access count analysis unit 3 therein.

The evaluated value storage unit 5 stores the evaluated value that has been predicted and calculated by the access count analysis unit 3.

Upon receiving the start signal 12, the menu update unit 6 acquires the updated evaluated value (predictive evaluated value), and updates the contents of the web page according to the order of the evaluated value. For example, when the start signal 12 becomes "1", the menu update unit 6 acquires an updated evaluated value from an evaluated value output 15 of the evaluated value storage unit 5, and updates the contents of the web page including the menu address 11 according to the order of the magnitudes of the evaluated values (magnitude relation).

Also, upon completion of the update, the menu update unit 6 stores the contents of the web page that has been updated, and outputs a public signal 16. For example, upon completion of the update, the menu update unit 6 stores the contents of the web page that has been updated in the web page definition field storage unit 7, sets the public signal 16 to "1", and outputs the signal. The public signal 16 is a signal whose value "1" is an active level.

The web page definition field storage unit 7 stores the contents of the web page that has been updated as the web page definition field.

Upon receiving the public signal 16, the web page publication unit 8 publishes the contents of the web page that has been updated. For example, when the public signal 16 becomes "1", the web page publication unit 8 publishes the contents of the web page definition field that has been stored in the web page definition field storage unit 7 to the internet.

In this example, a server device that manages the web pages, blogs, and so on is assumed as an example of the automatic updating apparatus. As examples of the server devices, a web server, a blog server, an ISP (internet service provider) server, and so on are conceivable. In this specification, the server device is not limited to a physical device, but may be of a virtual machine (VM) environment that functions as a server. In fact, the present invention is not limited to those examples.

As examples of the web pages, individual sites, enterprise sites, news sites, blog sites, download sites, internet sales sites, and the like are conceivable. In this example, the web page is indicative of a menu list on the network. Accordingly, a list of goods indicated on the download sites, the internet sales sites, or the like also correspond to "a menu list on the network". Also, the menu is not limited to a character string, but may be of an image or icons. However, in fact, the menu is not limited to those examples.

As examples of the address input unit 1, a keyboard, a keypad, a keypad on a screen, a touch panel (touch panel), a tablet (tablet), a scanner or a bar code reader which reads a QR code (registered trademark), and the like are conceivable. Alternatively, the address input unit 1 may be an interface (I/F: interface) that acquires address information from an external input device or an external communication device. Also, the address input unit 1 may be of a plug-in (plug-in) or a resident program for automatically acquiring an address input to an application enabling a network such as a web browser. The address input unit 1 is not limited to one type, but may be plural. However, in fact, the address input unit 1 is not limited to those examples.

As examples of the start timer unit 2, the access count analysis unit 3, the menu update unit 6, and the web page publication unit 8, a processing unit such as a CPU (central processing unit) or a microprocessor (microprocessor), or a semiconductor integrated circuit (Integrated Circuit (IC)) having the same function is conceivable. The address input unit 1, the start timer unit 2, the access count analysis nit 3, the menu update unit 6, and the web page publication unit 8 may be a program for causing a computer to execute the respective functions. However, in fact, those units are not limited to those examples.

As examples of the access log storage unit 4, the evaluated value storage unit 5, the menu update unit 6, and the web page definition field storage unit 7, a semiconductor storage device such as a memory, an external storage device (storage) such as a hard disk, a storage medium (media), or the like is conceivable. However, in fact, those units are not limited to those examples.

In the present invention, the access log storage unit 4, the evaluated value storage unit 5, and the web page definition field storage unit 7 may be stored in a server, a peripheral device, or the like. In this case, the access count analysis unit 3, the menu update unit 6, and the web page publication unit 8 may access to the server, the peripheral device, or the like, and refer to the access log storage unit 4, the evaluated value storage unit 5, and the web page definition field storage unit 7 when executing the respective processing. The access count analysis unit 3, the menu update unit 6, and the web page publication unit 8 halt a series of processing when they cannot refer to the access log storage unit 4, the evaluated value storage unit 5, and the web page definition field storage unit 7.

Figure 2:
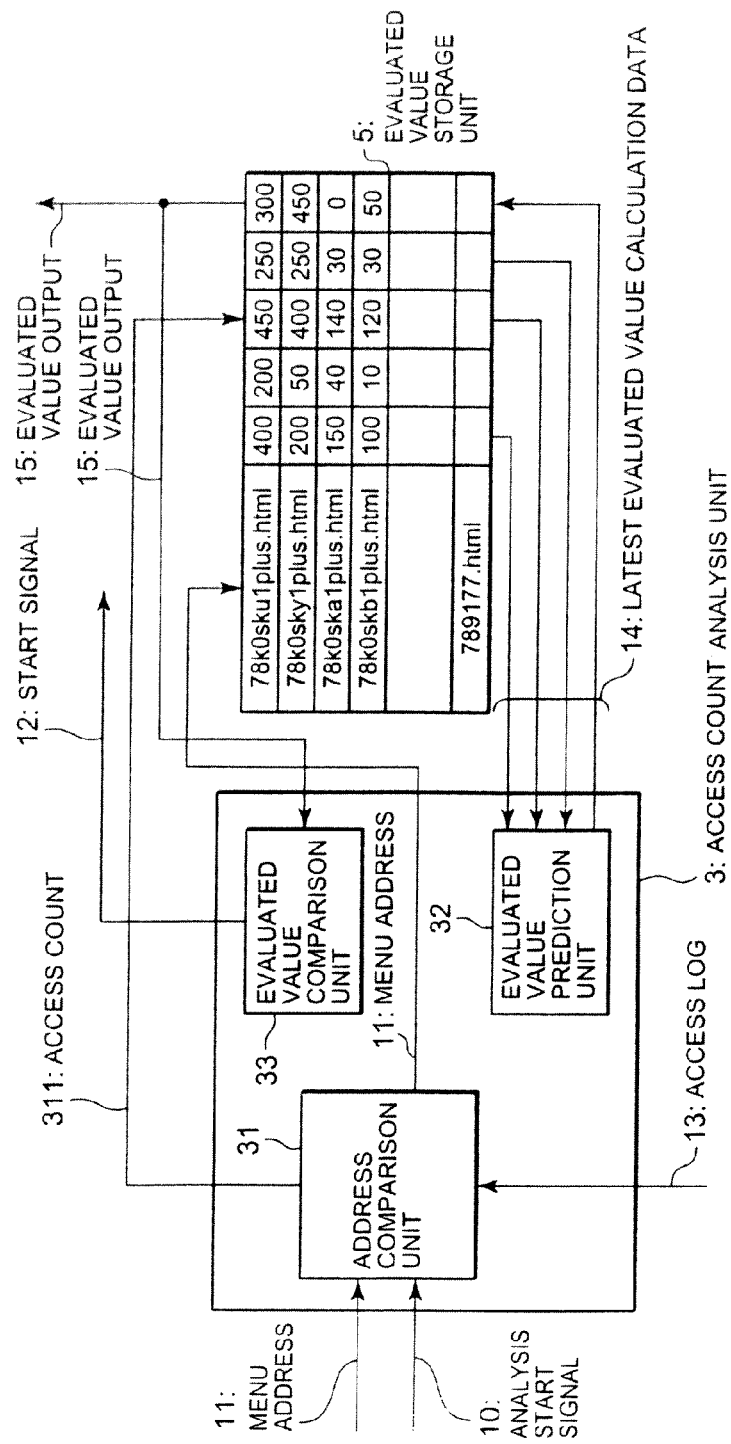
FIG. 2 is a block diagram showing a configuration example of an access count analysis unit 3 in the first exemplary embodiment.

Subsequently, the configuration example of the access count analysis unit 3 in the first exemplary embodiment will be described with reference to FIG. 2.

The access count analysis unit 3 includes an address comparison unit 31, an evaluated value prediction unit 32, and an evaluated value comparison unit 33.

The address comparison unit 31 receives the analysis start signal 10, the menu address 11, and the access log 13, and outputs the menu address 11 and an access count 311 to the evaluated value storage unit 5. The address comparison unit 31 may output the menu address 11 and the access count 311 as one signal. For example, the address comparison unit 31 may include the contents of the access count 311 in the output signal of the menu address 11. Thereafter, the address comparison unit 31 outputs a comparison completion signal (not illustrated). The comparison completion signal may be a flag indicative of comparison completion. In this case, the address comparison unit 31 enables the flag indicative of the comparison completion instead of outputting a comparison completion signal.

When T1, T2, and T3 are set in older order of time series, the evaluated value prediction unit 32 inputs the number of accesses at time point T1, the number of accesses at time point T2, and the evaluated value at time point T2 from the evaluated value storage unit 5, predicts and calculates the evaluated value at time point T3 at each menu address 11, and outputs the updated evaluated value (a predictive evaluated value at T3) as latest evaluated value calculation data 14 to the evaluated value storage unit 5.

In this example, the evaluated value prediction unit 32 refers to the number of accesses at time point T1, the number of accesses at time point T2, and the evaluated value at time point T2 from the evaluated value storage unit 5 according to the comparison completion signal from the address comparison unit 31. For example, when the evaluated value prediction unit 32 receives or detects the comparison completion signal from the address comparison unit 31, or when the flag indicative of the comparison completion is enabled, the evaluated value prediction unit 32 determines that the access request to the evaluated value storage unit 5 is accepted, accesses to the evaluated value storage unit 5, and refers to the number of accesses at time point T1, the number of accesses at time point T2, and the evaluated value at time point T2. In this case, the evaluated value prediction unit 32 may acquire the number of accesses at time point T1, the number of accesses at time point T2, and the evaluated value at time point T2 from the evaluated value storage unit 5.

Now, an example of a formula for calculation of the updated evaluated value will be described.

When T1, T2, and T3 are set in older order of time series, the formula for calculation of the updated evaluated value (predictive evaluated value) can be represented as follows.

Formula for calculation:

(evaluated value at time point T1)+((the number of accesses at time point T2)−(the number of accesses at time point T1))/(T2−T1)−(evaluated value at time point T2)

(evaluated value at time point T2)+((the number of accesses at time point T3)−(the number of accesses at time point T2))/(T3−T2)−(predictive evaluated value at time point T3)

In the first exemplary embodiment, because the respective intervals of T1, T2, and 13 are unit time, T1, 12, and T3 are arranged at regular intervals. That is, (T3−T2)=(T2−T1)=unit time is satisfied.

In this example, it is assumed that the number of accesses at time point T3 is the number of predictive accesses at T3. In this case, the formula for calculation of the number of accesses at time point 13 can be represented as follows.

Formula for calculation:

(the number of accesses at time point T3)−(the number of accesses at time point T2)+((the number of accesses at time point T2))−(the number of accesses at time point T1))

Accordingly, the formula for calculation of the updated evaluated value (predictive evaluated value at T3) can be represented as follows.

Formula for calculation:

(evaluated value at time point T2)+((the number of accesses at time point T2)−(the number of accesses at time point T1))/(T2−T1)−(predictive evaluated value at time point T3)

The evaluated value comparison unit 33 inputs the evaluated value output 15 from the evaluated value storage unit 5, refers to the updated evaluated value included in the evaluated value output 15, and sets the start signal 12 to "1", and outputs the signal when detecting the reversal of the evaluated value. For example, when the updated evaluated value is not arranged in ascending order or in descending order, the evaluated value comparison unit 33 determines that the evaluated value is reversed, sets the start signal 12 to "1", and outputs the signal.

Figure 3:
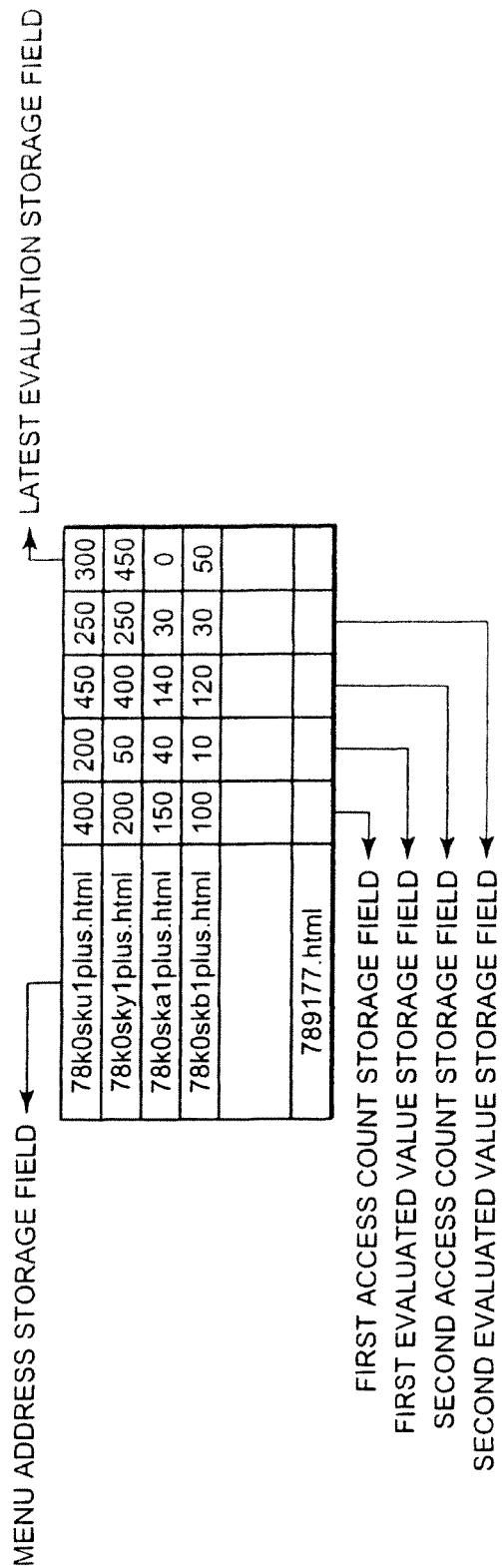
FIG. 3 is a diagram showing a field configuration example of a data table in an evaluated value storage unit 5.

Subsequently, a field configuration example of the data table in the evaluated value storage unit 5 will be described with reference to FIG. 3.

The evaluated value storage unit 5 includes a menu address storage field, a first access count storage field, a first evaluated value storage field, a second access count storage field, a second evaluated value storage field, and an updated evaluated value storage field. The first access count storage field stores information indicative of the number of accesses at time point T1. The first evaluated value storage field stores information indicative of the evaluated value at time point T1. The second access count storage field stores information indicative of the number of accesses at time point T2. The second evaluated value storage field stores information indicative of the evaluated value at time point T2. The updated evaluated value storage field stores information indicative of the updated evaluated value. The first access count storage field, the first evaluated value storage field, the second access count storage field, the second evaluated value storage field, and the updated evaluated value storage field are associated with each other for each of the menu addresses 11.

Figure 4:
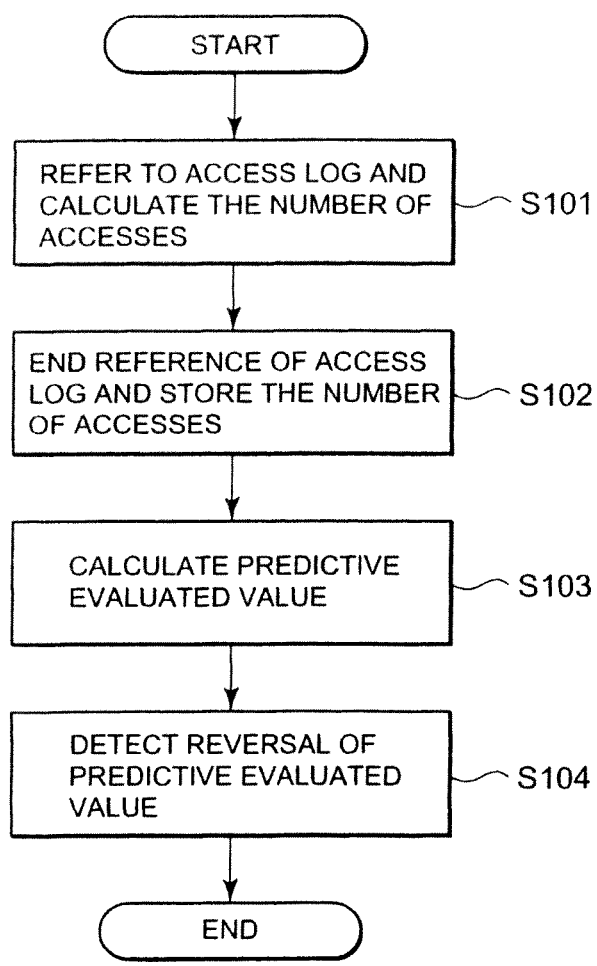
FIG. 4 is a flowchart showing a basic operation in the present invention.

Subsequently, the basic operation in the present invention described with reference to FIG. 4.

(1) Step S101

When the analysis start signal 10 becomes the access comparison unit 31 refers to (reads) the access log 13, counts accesses to the menu address 11, and calculates the number of accesses.

(2) Step S102

Upon completion of reading the access log 13, the access comparison unit 31 stores the menu address 11 and the number of accesses 311 in the evaluated value storage unit 5.

(3) Step S103

When T1, T2, and T3 are set in older order of time series, the evaluated value prediction unit 32 inputs the number of accesses (first access count storage field) at time point T1, the number of accesses (second access count storage field) at time point T2, and the evaluated value (second evaluated value storage field) at time point T2 from the evaluated value storage unit 5, predicts and calculates the evaluated value at time point T3 at each menu address 11 based on the formula for calculation, outputs the updated evaluated value (a predictive evaluated value at T3) as latest evaluated value calculation data 14, and stores the updated evaluated value (predictive evaluated value at T3) in the updated evaluated value storage field of the evaluated value storage unit 5.

(4) Step S104

The evaluated value comparison unit 33 reads the updated evaluated value storage field of the evaluated value storage unit 5, and sets the start signal 12 to "1", and outputs the signal when the reversal of evaluated value is detected. In this example, when the updated evaluated value is not arranged in descending order or in ascending order, the evaluated value comparison unit 33 determines that the evaluated value is reversed, sets the start signal 12 to "1", and outputs the signal. Alternatively, the evaluated value comparison unit 33 can compare the order of arrangement of the existing menus with the order of arrangement of the menus based on the magnitude relation of the updated evaluated value, and can set the start signal 12 to "1", and can output the signal when the order of arrangement of the respective menus is different from each other.

Figure 5B:
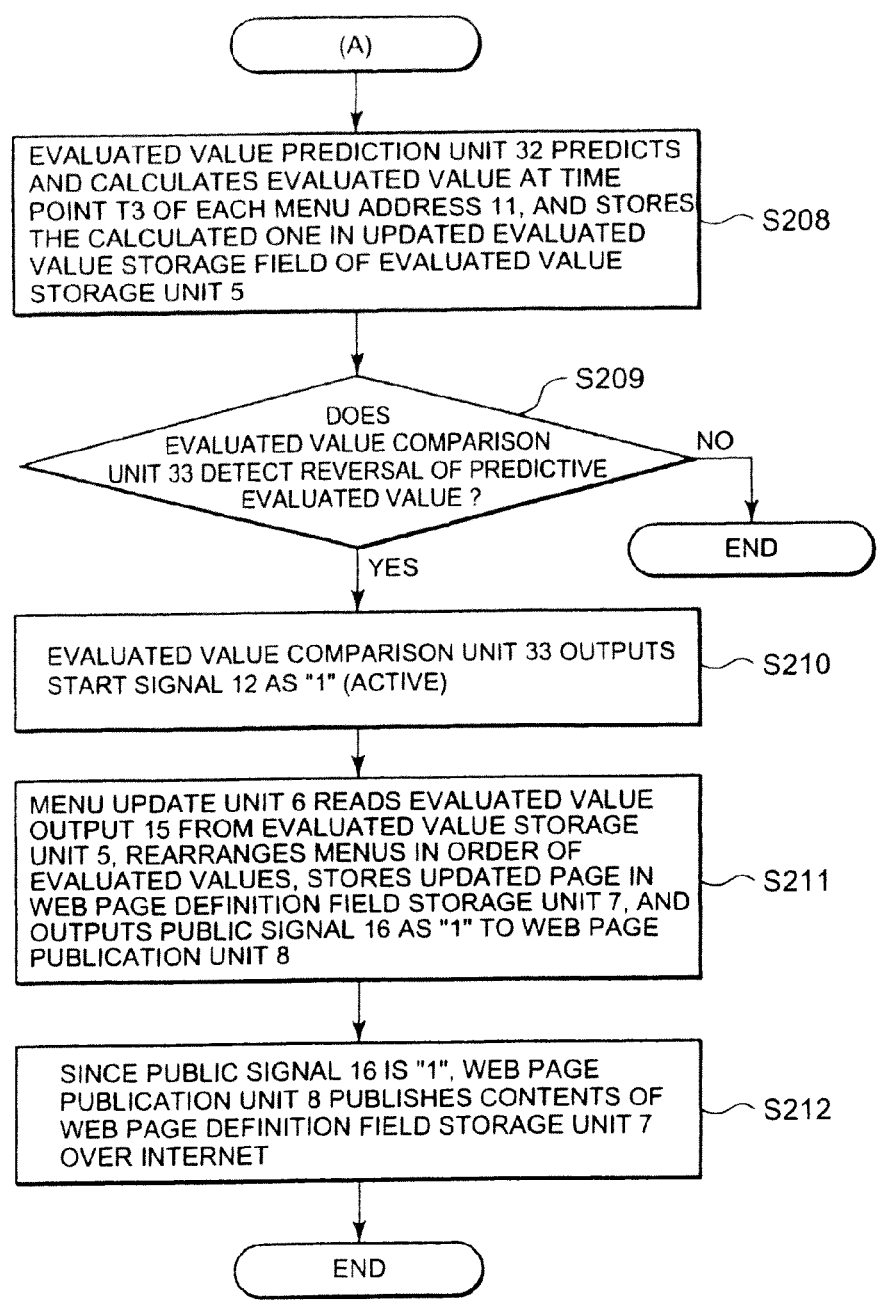
FIG. 5B is a flowchart showing the operation of the access count analysis unit 3 in the first exemplary embodiment.

The operation of the access count analysis unit 3 in the first exemplary embodiment will be described with reference to FIGS. 5A and 5B.

(1) Step S201

The access count analysis unit 3 confirms whether the analysis start signal 10 is output at an active level from the start timer unit 2, or not. At this time, the access count analysis unit 3 monitors the analysis start signal 10 until the analysis start signal 10 is output at the active level if the analysis start signal 10 is not output at the active level from the start timer unit 2.

(2) S202

The access count analysis unit 3 reads the access log 13 from the access log storage unit 4, and calculates the number of accesses for each of the menu addresses 11 if the analysis start signal 10 is output at the active level from the start timer unit 2 (i.e., "Yes" in step 201).

(3) Step S203

The access count analysis unit 3 confirms whether the time integration value of the number of accesses of the menu address 11 read from the address input unit 1 increases, or not.

(4) Step S204

The access count analysis unit 3 increases the evaluated value when the time differential value of the number of accesses to the menu address 11 increases.

(5) Step S205

The access count analysis unit 3 decreases the evaluated value when the time differential value of the number of accesses to the menu address 11 does not increase (e.g., decreases or equal).

(6) Step S206

The access count analysis unit 3 calculates the evaluated value in each of the menu addresses 11, and stores the calculated evaluated value in the evaluated value storage unit 5. At this time, the access count analysis unit 3 outputs the evaluated value calculated in each of the menu addresses 11 to the evaluated value storage unit 5 as the latest evaluated value calculation data 14.

(7) Step S207

The access count analysis unit 3 confirms whether the menu address 11 whose evaluated value is to be calculated remains, or not. When the menu address 11 whose evaluated value is to be calculated remains (i.e., "Yes" in step S207), the access count analysis unit 3 confirms whether the menu address 11 whose evaluated value is to be calculated remains, or not. When the menu address 11 whose evaluated value is to be calculated remains, the access count analysis unit 3 confirms whether the time differential value of the number of accesses to the subject menu address 11 increases, or not, and repeats the above processing until the menu address 11 whose evaluated value is to be calculated is eliminated.

(8) Step S208

When the menu address 11 whose evaluated value is to be calculated does not remain (i.e., "No" in step S207), the access count analysis unit 3 predicts and calculates the evaluated value at time point T3 of the respective menu addresses 11, outputs the updated evaluated value (estimated evaluated value at T3) as the latest evaluated value calculation data 14, and stores the updated evaluated value (predictive evaluated value at T3) in the updated evaluated value storage field of the evaluated value storage unit 5. In this example, the evaluated value prediction unit 32 predicts and calculates the evaluated value at time point T3 of the respective menu addresses 11, outputs the updated evaluated value (estimated evaluated value at T3) as the latest evaluated value calculation data 14, and stores the updated evaluated value (predictive evaluated value at T3) in the updated evaluated value storage field of the evaluated value storage unit 5.

(9) Step S209

The access count analysis unit 3 confirms whether the reversal of the predictive evaluated value has been detected, or not. When the reversal of the predictive evaluated value has not been detected (i.e., "No" in step S209), the access count analysis unit 3 completes its processing. In this example, the evaluated value comparison unit 33 confirms whether the reversal of the predictive evaluated value has been detected, or not. The reversal of the predictive evaluated value is directed to a state in which the predictive evaluated value is not arranged in order corresponding to the magnitude relation.

(10) Step S210

When the reversal of the predictive evaluated value has been detected (i.e., "Yes" in step S209), the access count analysis unit 3 sets the start signal 12 to an active level, and outputs the signal. In this example, the evaluated value comparison unit 33 sets the start signal 12 to value "1" being the active level, and outputs the signal.

(11) Step S211

The menu update unit 6 reads the evaluated value output 15 from the evaluated value storage unit 5, rearranges the menu in order of the evaluated values, stores the updated web page in the web page definition field storage unit 7, and outputs the public signal 16 as "1" (i.e., the active level) to the web page publication unit 8.

(12) Step S212

The web page publication unit 8 publishes the contents of the web page definition field storage unit 7 on the network because the publish signal 16 is "1" (i.e., the active level).

The menu that has not yet been updated at time point T2 will be described with reference to FIG. 6.

In this case, an example of the menus related to a general-purpose microcomputer will be described. As an example of the general-purpose microcomputer, an 8-bit 78KOS microcomputer is assumed. As an example of titles of the menu related to the general-purpose microcomputer, "78KOS/KU1+", "78KOS/KY1+", "78KOS/KA1+", and "78KOS/KB1+" are indicated. In this case, the menu address of "78kOskulplus.html" corresponds to "78KOS/KU1+". The menu address of "78kOskylplus.html" corresponds to "78KOS/KY1+". The menu address of "78kOskalplus.html" corresponds to "78KOS/KA1+"

The menu address of "78 kOskblplus.html" corresponds to "78KOS/KB1+". However, in fact, the present invention is not limited to those examples.

An example of calculating the evaluated value in the first exemplary embodiment will be described with reference to FIG. 7. In this example, (T2−T1)−(T3−T2)=1 hour is assumed. Also, it is assumed that the number of accesses at T3 is (the number of accesses at time point T2)+(difference in the number of accesses of (T2−T1)). In this case, the access count analysis unit 3 calculates the respective predictive evaluated values of "78KOS/KU1+", "78KOS/KY1+", "78KOS/KA1+", and "78KOS/KB1+" as follows.

(1) "78KOS/KU1+"

The number of accesses at time point T1=400, the number of accesses at time point T2=450, and the number of accesses at time point T3=500.

It is assumed that the evaluated value at time point T1 is 200.

The evaluated value at time point T2: 200+(450−400)/(T2−T1)=250

The evaluated value at time point T3: 250+(500−450)/(T3−T2)=300

(2) "78KOS/KY1+"

The number of accesses at time point T1=200, the number of accesses at time point T2=400, and the number of accesses at time point T3=600.

It is assumed that the evaluated value at time point T1 is 50.

The evaluated value at time point T2: 50+(400−200)/(T2−T1)=250

The evaluated value at time point T3: 250+(400−200)/(T3−T2)−450

Because an increase in the evaluated value of "78KOS/KY1+" exceeds an increase in the evaluated value of "78KOS/KU1+", the reversal of the evaluated value can be expected at timing of T3. In this time, the menu change is implemented at timing of Step S210 in FIG. 5B.

(3) "78KOS/KA1+"

The number of accesses at time point T1=150, the number of accesses at time point T2=140, and the number of accesses at time point T3−130.

It is assumed that the evaluated value at time point T1 is 40.

The evaluated value at time point T2: 40+(140−150)/(T2−T1)=30

The evaluated value at time point T3: 30+(130−140)/(T3−T2)=20

(4) "78KOS/KB1+"

The number of accesses at time point T1=100, the number of accesses at time point T2=120, and the number of accesses at time point T3=140.

It is assumed that the evaluated value at time point T1 is 10.

The evaluated value at time point T2: 10+(120−100)/(T2−T1)=30

The evaluated value at time point T3: 30+(140−120)/(T3−T2)=50

Because an increase in the evaluated value of "78KOS/KB1+" exceeds an increase in the evaluated value of "78KOS/KA1+", the reversal of the evaluated value can be expected at timing of T3. In this time, the menu change is implemented at timing of Step S210 in FIG. 5B.

The menu that has been changed will be described with reference to FIG. 8.

As shown in FIG. 7, when the reversal of the evaluated value occurs, the access count analysis unit 3 replaces "78KOS/KU1+" and "78KOS/KY1+" with each other to rearrange the menu address of "78kOskulplus.html" and the menu address of "78kOskylplus.html". Similarly, the access count analysis unit 3 replaces "78KOS/KA1+" and "78KOS/KB1+" with each other to rearrange the menu address of "78kOskalplus.html" and the menu address of "78kOskblplus.html". However, in fact, the menu is not limited to those examples.

Second Exemplary Embodiment

Hereinafter, a second exemplary embodiment of the present invention will be described.

In the second exemplary embodiment, an RSS article is retrieved from an external PING server, and the number of coincidences of the browse Uniform Resource Locator (URL) with the menu address is added to the evaluated value. In this example, the menu address as a keyword is compared with the browse URL.

That is, the number of coincidences of the browse URL field with a given keyword is added to the evaluated value. The PING server is a server that receives and collects RSS information transmitted from the respective blogs. The RSS information mainly includes update information such as blogs.

Figure 9:
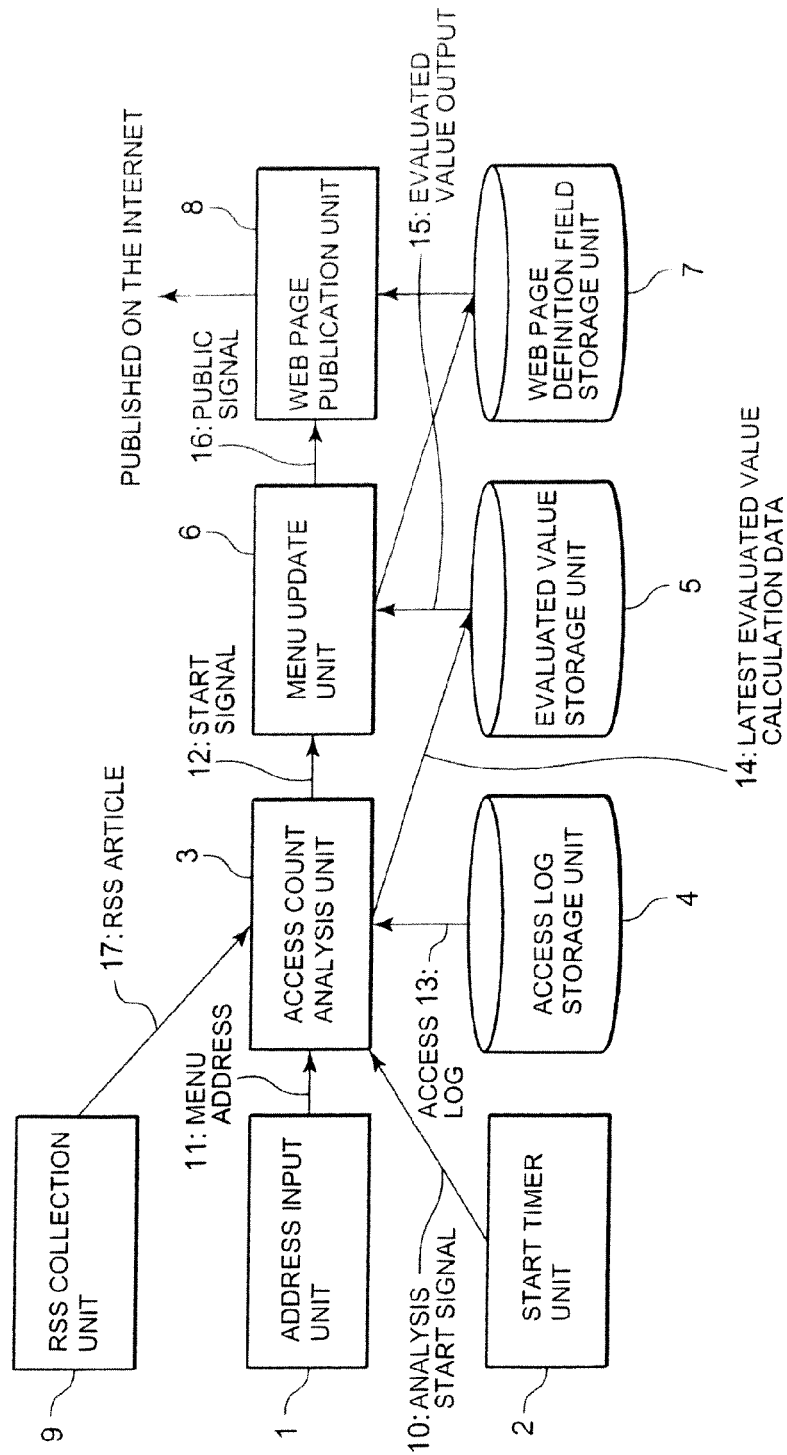
FIG. 9 is a block diagram showing a configuration example in a second exemplary embodiment of the present invention.

Referring to FIG. 9, an automatic updating apparatus according to the second exemplary embodiment includes an address input unit 1, a start timer unit 2, an access count analysis unit 3, an access log storage unit 4, an evaluated value storage unit 5, a menu update unit 6, a web page definition field storage unit 7, a web page publication unit 8, and an RSS collection unit 9.

The address input unit 1, the start timer unit 2, the access count analysis unit 3, the access log storage unit 4, the evaluated value storage unit 5, the menu update unit 6, the web page definition field storage unit 7, and the web page publication unit 8 are basically identical with those in the first exemplary embodiment. In the second exemplary embodiment, the access count analysis unit 3 further analyzes the number of RSS articles taken by another site such as a blog, and calculates the evaluated value.

The RSS collection unit 9 acquires an RSS article 17 from the PING server, and supplies the RSS article 17 to the access count analysis unit 3. In this case, the access count analysis unit 3 acquires the RSS article 17 from the RSS collection unit 9 in synchronism with the analysis start signal 10. At this time, the RSS collection unit 9 may supply the RSS article 17 to the access count analysis unit and may start the collection of a subsequent RSS article 17 since a time point when the RSS article 17 is possessed by the RSS collection unit 9 is eliminated, and may supply the collected RSS article 17 thereto when again receiving a request for the RSS article 17 from the access count analysis unit 3. As a result, the RSS collection unit 9 can supply only the RSS article 17 within the unit time to the access count analysis unit 3.

As an example of the RSS collection unit 9, an RSS reader or the like is conceivable. The RSS collection unit 9 may be a PING server per se. However, in fact, the present invention is not limited to those examples.

As an example of the RSS article 17, an RSS field, an Atom field, a micro format such as hReview, or the like is conceivable. However, in fact, the present invention is not limited to those examples.

Figure 10:
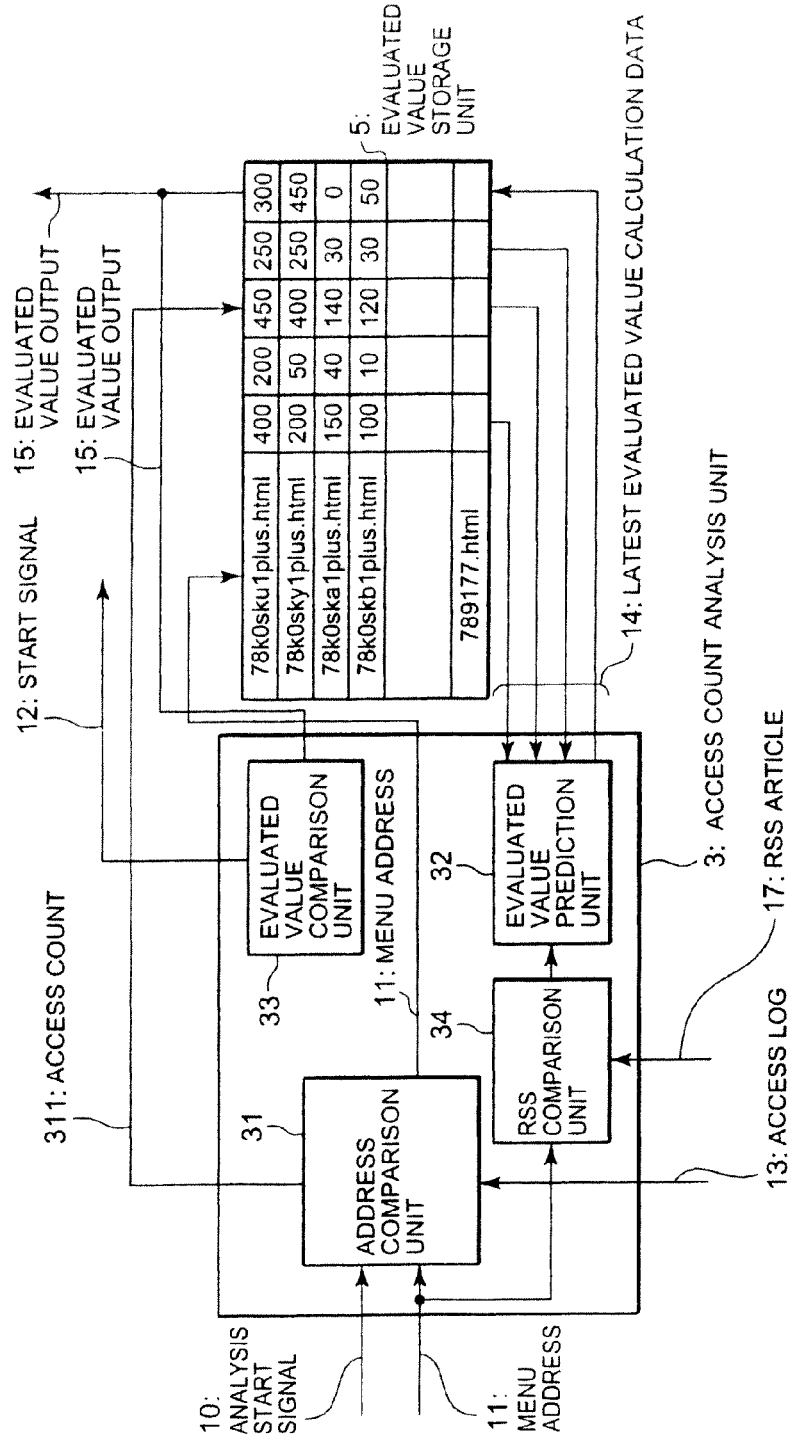
FIG. 10 is a block diagram showing a configuration example of an access count analysis unit 3 in the second exemplary embodiment.

Subsequently, a description will be given of a configuration example of the access count analysis unit 3 according to the second exemplary embodiment with reference to FIG. 10.

The access count analysis unit 3 includes an address comparison unit 31, an evaluated value prediction unit 32, an evaluated value comparison unit 33, and an RSS comparison unit 34.

The address comparison unit 31 receives the analysis start signal 10, the menu address 11, and the access log 13, and outputs the menu address 11 and an access count 311 to the evaluated value storage unit 5.

When T1, T2, and T3 are set in older order of time series, the evaluated value prediction unit 32 receives the number of accesses at time point T1, the number of accesses at time point T2, and the evaluated value at time point T2 from the evaluated value storage unit 5, as well as receives the processing result of the RSS comparison unit 34, predicts and calculates the evaluated value at time point T3 at each menu address 11, and outputs the updated evaluated value (a predictive evaluated value at T3) as latest evaluated value calculation data 14 to the evaluated value storage unit 5.

The evaluated value comparison unit 33 receives the evaluated value output 15 from the evaluated value storage unit 5, sets the start signal 12 to "1", and outputs the signal.

The RSS comparison unit 34 receives the menu address 11 and the RSS article 17, and outputs the processing result to the evaluated value prediction unit 32. In this case, the RSS comparison unit 34 calculates the number of common RSS articles 17. For example, the RSS comparison unit 34 compares the browse URL within the RSS article 17 with a keyword associated with the menu address 11, and counts up the number of common articles when the browse URL and the keyword are coincident with each other.

That is, the number of common articles is indicative of the number of browse URLs related to the same contents. After the RSS comparison unit 34 has completely compared the browse URL with the subject keyword for all of menu addresses 11, the RSS comparison unit 34 outputs the number of common articles as the processing results to the evaluated value prediction unit 32.

It is preferable that the keyword is associated with the menu address 11. However, in fact, the keyword may not be associated with the menu address 11, but may be a character string most used within the RSS article 17. In this case, the RSS comparison unit 34 detects the character string most used within the RSS article 17, and compares the detected character string with the browse URL.

At this time, it is preferable that the RSS comparison unit 34 refers to, when receiving the RSS article 17, the site update time field within the RSS article 17 in each of the menu addresses 11, and conducts the above processing on only the RSS article 17 whose update time is within the unit time during analysis. For example, the RSS comparison unit 34 compares the browse URL with a given keyword in each of the menu addresses 11 for only the RSS article 17 whose update time is between T1 and T2, and counts up the number of common articles when the browse URL is coincident with the given keyword.

In the second exemplary embodiment, the evaluated value prediction unit 32 predicts and calculates the updated evaluated value (predictive evaluated value) by further addition of the number of common articles when predicting and calculating the evaluated value at time point T3 in each of the menu address 11.

Now, an example of calculating the updated evaluated value will be described.

When T1, T2, and T3 are in older order of time series, a formula for calculation of the updated evaluated value (predictive evaluated value at T3) can be represented as follows.

Formula for calculation:

(evaluated value at time point T1)+((the number of accesses at time point T2)−(the number of accesses at time point T1))/(T2−T1)=(evaluated value at time point T2)

(evaluated value at time point T2)+((the number of accesses at time point T3)−(the number of accesses at time point T2))/(T3−T2)+the number of common articles=(predictive evaluated value at time point T3)

In the second exemplary embodiment, because the respective intervals of T1, T2, and T3 are unit time, T1, T2, and T3 are arranged at regular intervals. That is, (T3−T2)=(T2−T1)= unit time is satisfied.

In this example, it is assumed that the number of accesses at time point T3 is the number of predictive accesses at T3. In this case, the formula for calculation of the number of accesses at time point T3 can be represented as follows.

Formula for calculation:

(the number of accesses at time point T3)=(the number of accesses at time point T2)+((the number of accesses at time point T2))−(the number of accesses at time point T1)

Accordingly, the formula for calculation of the updated evaluated value (predictive evaluated value at T3) can be represented as follows.

Formula for calculation:

(evaluated value at time point T2)+((the number of accesses at time point T2)−(the number of accesses at time point T1))/(T2−T1)+the number of common articles=(predictive evaluated value at time point T3)

Figure 11:
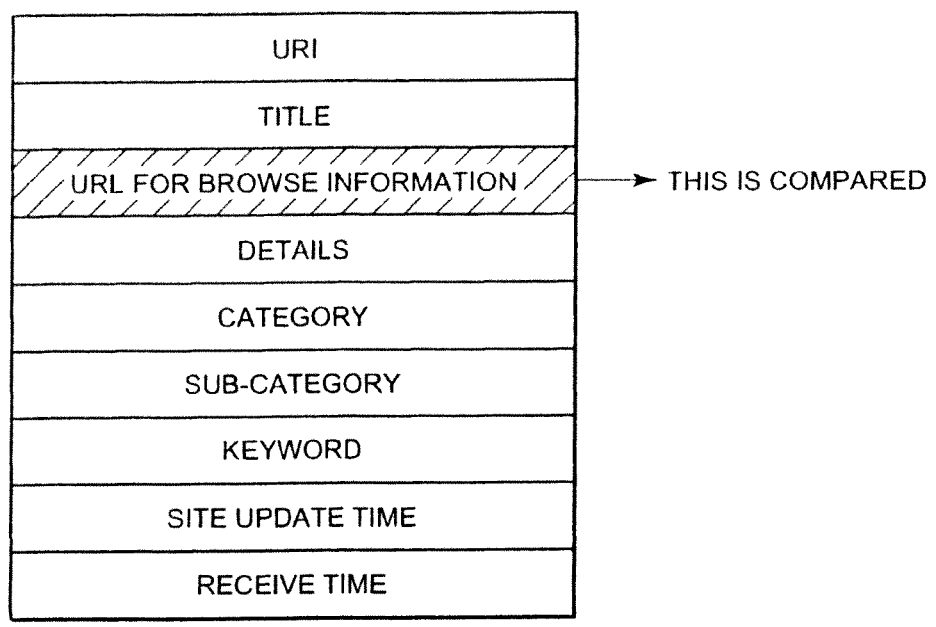
FIG. 11 is a diagram showing an example of a format of an RSS article.

An example of a format of the RSS article 17 will be described with reference to FIG. 11.

The RSS article 17 includes "UR1", "title", "URL of browse information", "details", "category", "sub-category", "keyword", "site update time", "receive time", and so on. In the second exemplary embodiment, the RSS comparison unit 34 compares the respective "browse information URLs" of a plurality of RSS articles 17 with each other. In this example, "URI" is a URI field that stores URI specifying the location of the blog site per se. The "browse information URL" is a browse URL field that stores the browse URL indicative of the location of information on the individual blog articles appearing on the blog site. Basically, the RSS article 17 is identical with the summary data of the RSS file format disclosed in JP-A-2006-209598. However, in fact, the present invention is not limited to those examples.

Figure 12B:
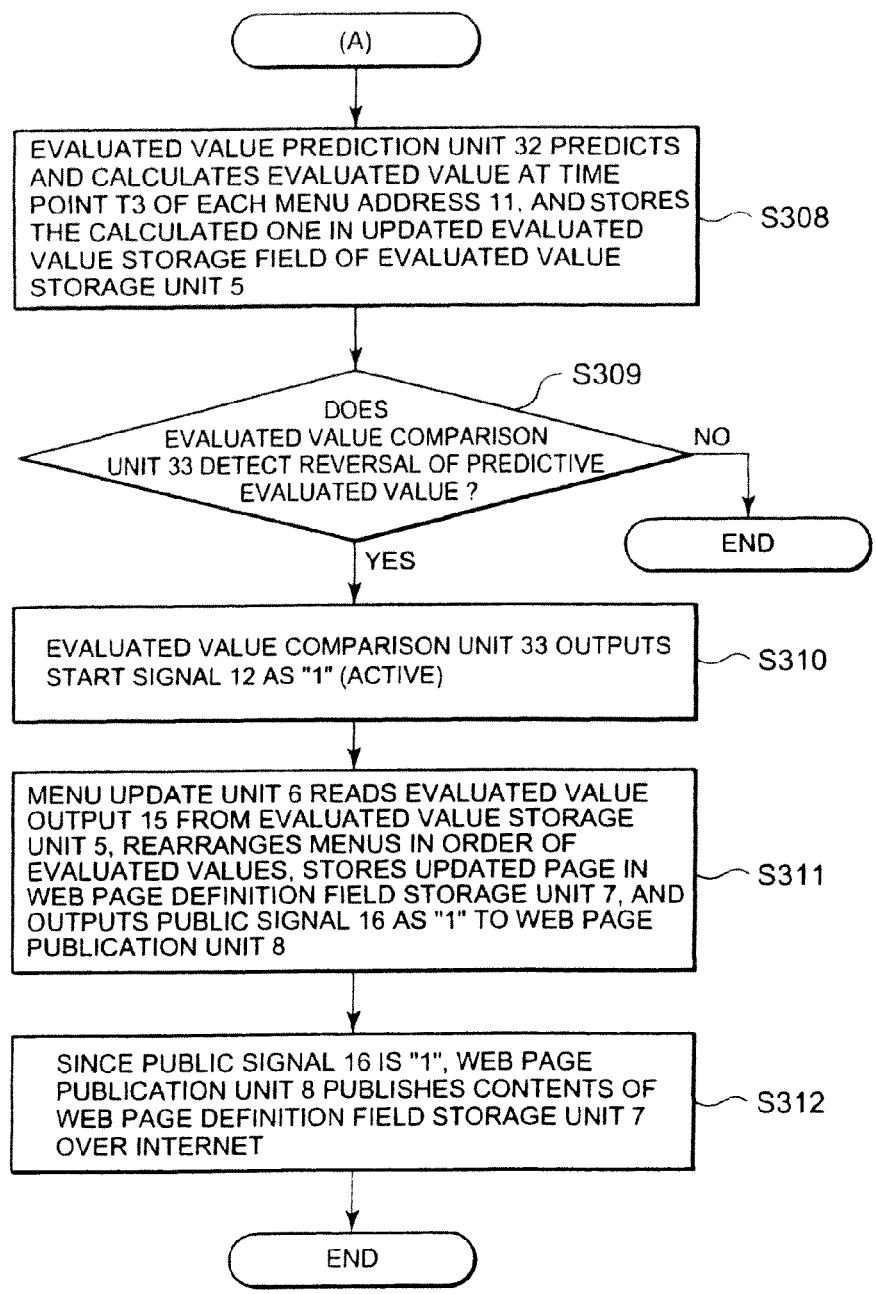
FIG. 12B is a flowchart showing the operation of the access count analysis unit 3 in the second exemplary embodiment.

The operation of the access count analysis unit 3 according to the second exemplary embodiment will be described with reference to FIGS. 12A and 12B.

(1) Step S301

The access count analysis unit 3 confirms whether the analysis start signal 10 is output at an active level from the start timer unit 2, or not. In this time, the access count analysis unit 3 monitors the analysis start signal 10 until the analysis start signal 10 is output at the active level if the analysis start signal 10 is not output at the active level from the start timer unit 2.

(2) Step S302

The access count analysis unit 3 reads the access log 13 from the access log storage unit 4, and calculates the number of accesses for each of the menu addresses 11 if the analysis start signal 10 is output at the active level from the start timer unit 2 (i.e., "Yes" in step S301). At the same time, the access count analysis unit 3 compares the browse URL field within the RSS article 17 with a given keyword for each of the menu addresses 11, and counts up when the browse URL field and the given keyword are coincident with each other. In this case, the RSS comparison unit 34 compares the browse URL field within the RSS article 17 with a keyword associated with the menu address 11, counts up the number of common articles when the browse URL and the subject keyword are coincident with each other, and adds the number of common articles when predicting and calculating the updated evaluated value. The browse URL field is indicative of "browse information URL" in FIG. 11. The processing in Step S302 is different from the processing in Step S202 according to the first exemplary embodiment shown in FIG. 5A.

(3) Step S303

The access count analysis unit 3 confirms whether the time integration (differential) value of the number of accesses of the menu address 11 read from the address input unit 1 increases, or not.

(4) Step S304

The access count analysis unit 3 increases the evaluated value when the time differential value of the number of accesses to the menu address 11 increases (i.e., decreases or is equal).

(5) Step S305

The access count analysis unit 3 decreases the evaluated value when the time differential value of the number of accesses to the menu address 11 does not increase.

(6) Step S306

The access count analysis unit 3 calculates the evaluated value in each of the menu addresses 11, and stores the calculated evaluated value in the evaluated value storage unit 5. In this time, the access count analysis unit 3 outputs the evaluated value calculated in each of the menu addresses 11 to the evaluated value storage unit 5 as the latest evaluated value calculation data 14.

(7) Step S307

The access count analysis unit 3 confirms whether the menu address 11 whose evaluated value is to be calculated remains, or not. When the menu address 11 whose evaluated value is to be calculated remains (i.e., "Yes" in step S307), the access count analysis unit 3 confirms whether the menu address 11 whose evaluated value is to be calculated remains, or not. When the menu address 11 whose evaluated value is to be calculated remains, the access count analysis unit 3 confirms whether the time differential value ref the number of accesses to the subject menu address 11 increases, or not, and repeats the above processing until the menu address 11 whose evaluated value is to be calculated is eliminated.

(8) Step S308

When the menu address 11 whose evaluated value is to be calculated does not remain (i.e., "No" in step S307), the access count analysis unit 3 predicts and calculates the evaluated value at time point T3 of the respective menu addresses 11, outputs the updated evaluated value (estimated evaluated value at T3) as the latest evaluated value calculation data 14, and stores the updated evaluated value (predictive evaluated value at T3) in the updated evaluated value storage field of the evaluated value storage unit 5. In this example, the evaluated value prediction unit 32 predicts and calculates the evaluated value at time point T3 of the respective menu addresses 11, outputs the updated evaluated value (estimated evaluated value at T3) as the latest evaluated value calculation data 14, and stores the updated evaluated value (predictive evaluated value at T3) in the updated evaluated value storage field of the evaluated value storage unit 5.

(9) Step S309

The access count analysis unit 3 confirms whether the reversal of the predictive evaluated value has been detected, or not. When the reversal of the predictive evaluated value has not been detected (i.e., "No" in step S309), the access count analysis unit 3 completes its processing. In this example, the evaluated value comparison unit 33 confirms whether the reversal of the predictive evaluated value has been detected, or not. The reversal of the predictive evaluated value is directed to a state in which the predictive evaluated value is not arranged in order corresponding to the magnitude relation.

(10) Step S310

When the reversal of the predictive evaluated value has been detected, the access count analysis unit 3 sets the start signal 12 to an active level, and outputs the signal. In this example, the evaluated value comparison unit 33 sets the start signal 12 to "1" (the active level), and outputs the signal.

(11) Step S311

The menu update unit 6 reads the evaluated value output 15 from the evaluated value storage unit 5, rearranges the menu in order of the evaluated values, stores the updated web page in the web page definition field storage unit 7, and outputs the public signal 16 as "1" (the active level) to the web page publication unit 8.

(12) Step S312

The web page publication unit 8 publishes the contents of the web page definition field storage unit 7 on the network because the publish signal 16 is "1" (the active level)

An example of calculating the evaluated value in the second exemplary embodiment will be described with reference to FIG. 13. In this example, (T2−T1)=(T3−T2)=1 hour is assumed. Also, it is assumed that the number of accesses at T3 (the number of accesses at time point T2)+(difference in the number of accesses of (T2−T1)). In this case, the access count analysis unit 3 calculates the respective predictive evaluated values of "78KOS/KU1+" and "78KOS/KY1+" as follows.

In the second exemplary embodiment, it is assumed that the number of articles of the RSS reader of "78 KOS/KU1+" at time point T2 is 10. Also, it is assumed that the number of articles of the RSS reader of "78 KOS/KY1+" at time point T2 is 100. In this example, it is assumed that the number of articles of the RSS reader is added.

(1) "78KOS/KU1+"

The number of accesses at time point T1=400, the number of accesses at time point T2=450, and the number of accesses at time point T3=500.

It is assumed that the evaluated value at time point T1 is 200.

The evaluated value at time point T2: 200+(450−400)/(T2−T1)=250

The evaluated value at time point T3: 250+(500−450)/(T3−T2)+10=310

(2) "78KOS/KY1+"

The number of accesses at time point T1=200, the number of accesses at time point T2=400, and the number of accesses at time point T3=600.

It is assumed that the evaluated value at time point T1 is 50.

The evaluated value at time point T2: 50+(300−200)/(T2−T1)=150

The evaluated value at time point T3: 150+(400−300)/(T3 12)+100=350

Because an increase in the evaluated value of "78KOS/KY1+" exceeds an increase in the evaluated value of "78KOS/KU1+", the reversal of the evaluated value can be expected at timing of T3. In this time, the menu change is implemented at timing of Step S310 in FIG. 12B.

In the second exemplary embodiment, because the evaluated value can be calculated by adding together the number of RSS articles associated with not only the audience's site but also other sites, an evaluated value close to a trend can be calculated. The calculated evaluated value is close to the number of times by which the RSS article of the subject site is referred to in fact.

As described above, in the present invention, because there is provided the access count analysis unit 3 that reflects an increase and a decrease in the number of accesses per time unit in the evaluated value, it is unnecessary to set the priority (priority). For that reason, an input unit and a storage unit for the priority are unnecessary.

Also, in the present invention, because the menu update start can be also automatically executed by the access count analysis unit 3 according to an increase and a decrease in the number of accesses, no manual (human) operation is required. That is, the present invention enables the menu to be automatically updated without troubling an administrator of the web page.

Also, no web data storage unit for the respective administrators is required because no web page (e.g., tree data) is provided for the respective administrators.

Further, the present invention enables the menu to be automatically updated taking into consideration the degree of an increase or a decrease in the number of accesses by a visitor (audience) of the web page.

In this example, the menu of the web page is described. However, in fact, the menu of the web page may be replaced with a menu of a display screen for application software, etc., which is operated by a server side. For example, the menu of the display screen for a CGI (Common Gateway Interface), a servlet, an online game, etc., is conceivable. In this case, the address of the web page or URL is replaced with the description of a source code related to the menu of the display screen. The access count analysis unit 3 counts the number of times by which the menu of the display screen is selected, at regular intervals, and sets the number of times as the number of accesses. The access count analysis unit 3 calculates the predictive evaluated value based on the number of accesses.

When the predictive evaluated values are not arranged in order corresponding to the magnitude relation, the menu updating unit 6 rearranges the description of the source code related to the menu of the display screen in order corresponding to the magnitude relation of the predictive evaluated values, and stores the description in the web page definition field storage unit 7. In this case, if the compiling of the source code is necessary, the menu update unit 6 rearranges the description of the source code related to the menu of the display screen in order corresponding to the magnitude relation of the predictive evaluated values, and thereafter executes the compiling of the source code, and stores the compiled one in the web page definition field storage unit 7.

The web page publication unit 8 publishes the menu of the display screen for the application software or the like based on data stored in the web page definition field storage unit 7. When the web page is used for the display screen, the same as that in the above respective exemplary embodiments already described is applicable. However, in fact, the present invention is not limited to those examples.

That is, the present invention is characterized by calculating the predictive evaluated value based on "a change in the number of accesses within the unit time" with respect to the menu list over the network, and updating the contents of the menus indicated on the menu list according to the respective magnitude relation of the estimated evaluated value. The format of the menu list is not limited to the list format in which the menus are aligned longitudinally and laterally, but may be a table format. Even in the case of the table format, it is assumed that the arrangement of the menus is based on the respective magnitude relations of the estimated evaluated values. Also, the menus may be a tab used for changing over a plurality of screens within one window. However, in fact, the present invention is not limited to those examples.

In the present invention, when the predictive evaluated value of a given menu becomes equal to or lower than 0, or when the predictive evaluated value of the given menu is greatly reduced, the subject menu may not be indicated on the menu list over the network. In this case, it is possible that the subject menu is deleted from the menu list over the network, and after a given period has been elapsed, the subject menu is indicated in the menu list over the network. It is preferable that the given period is a multiple of the unit time. For example, upon receiving the start signal 12, the menu update unit 6 acquires the predictive evaluated value from the evaluated value storage unit 5, and deletes the subject menu from the menu list over the network when the predictive evaluated value of a given menu is greatly reduced. After 24 hours have elapsed, the menu update unit 6 updates the menu so as to again indicate the subject menu in the menu list over the network.

The expression "when the predictive evaluated value of a given menu is greatly reduced" is directed to a case in which a difference between the predictive evaluated value immediately before and the present predictive evaluated value, is equal to or lower than a given threshold value, a case in which the degree of a decrease In the present predictive evaluated value is larger than that in the predictive evaluated value immediately before, or the like. In this case, the menu update unit 6 may store the predictive evaluated values at a plurality of continuous time points in the storage region of the menu update unit 6, or acquire the predictive evaluated values from the evaluated value storage unit 5 through the evaluated value output 15. However, in fact, the present invention is not limited to those examples.

When a variation in the predictive evaluated value of the given menu is eliminated for a given period except for the above case, because it is presumed that the audiences of the subject menu are being fixed, the display position of the subject menu in the menu list may be fixed to a specific position.

When the variation in the predictive evaluated value of the given menu is slight, it is meant that a change in the number of accesses within the unit time is slight. It is predicted that a given number of specific audiences browse the subject menu periodically.

For example, when a difference between the predictive evaluated value immediately before and the present predictive evaluated value is slight, the menu update unit 6 updates the menu so as to set the display position of the subject menu in the menu list at the bottom step. In this case, the menu update unit 6 may store the predictive evaluated values at a plurality of continuous time points in the storage region of the menu update unit 6, or acquire the predictive evaluated values from the evaluated value storage unit 5 through the evaluated value output 15.

Also, when a variation in the predictive evaluated value of the given menu again occurs, the menu update unit 6 may halt a process of fixing the display position of the subject menu to a specific position, and change the contents of the menus indicated in the menu list according to the respective magnitude relations of the predictive evaluated values at that time point. However, in fact, the present invention is not limited to those examples.

Although the invention has been described above in connection with several exemplary embodiments thereof, it will be appreciated by those skilled in the art that those embodiments are provided solely for illustrating the invention, and should not be relied upon to construe the appended claims in a limiting sense.

Further, it is noted that, notwithstanding any claim amendments made hereafter, applicant's intent is to encompass equivalents all claim elements, even if amended later during prosecution.

What is claimed is:

1. An automatic updating apparatus, comprising:
   a traffic receiver, as executed by a processor on said apparatus, that receives numbers per unit time of accesses of more than one menu displayed in a screen and calculates rates of variability with respect to numbers of accesses to each menu; and
   a menu updating unit that updates a menu display in the screen based on the rates of variability,
   wherein the rates of variability comprise derivative values with respect to the number of accesses in an interval which includes at least two units of time.

2. The automatic updating apparatus according to claim 1, wherein the menu updating unit changes a display position of the each of more than one menu.

3. The automatic updating apparatus according to claim 1, the traffic receiver generating a first signal in response to an increase of the rates of variability and notifying the menu updating unit.

4. The automatic updating apparatus according to claim 1, further comprising a traffic storing unit, wherein the traffic receiver stores the number per unit time of the accesses of more than one menu in the traffic storing unit.

5. An automatic updating apparatus, comprising:
- a traffic receiver, as executed by a processor on said apparatus, that receives numbers per unit time of accesses of more than one menu displayed in a screen and calculates rates of variability with respect to numbers of accesses to each menu;
- a menu updating unit that updates a menu display in the screen based on the rates of variability; and
- an access log storing unit that stores the number of accesses to the each of more than one menu,
- wherein the traffic receiver acquires the numbers per unit time of the accesses of more than one menu from the access log storing unit.

6. An automatic updating apparatus, comprising:
- a traffic receiver, as executed by a processor on said apparatus, that receives numbers per unit time of accesses of more than one menu displayed in a screen and calculates rates of variability with respect to the numbers of accesses to each menu; and
- a menu updating unit that updates a menu display in the screen based on the rates of variability,
- wherein the traffic receiver acquires a change of the number per unit time of the accesses of more than one menu based on a second signal received at predefined intervals.

7. An automatic updating apparatus, comprising:
- a traffic receiver, as executed by a processor on said apparatus, that receives numbers per unit time of accesses of more than one menu displayed in a screen and calculates rates of variability with respect to the numbers of accesses to each menu; and
- a menu updating unit that updates a menu display in the screen based on the rates of variability,
- wherein the traffic receiver comprises a traffic predicting unit that calculates the number of accesses on a forward time based on the number per unit time of the accesses of more than one menu,
- wherein the traffic receiver calculates the rates of variability based on the number of accesses on a forward time.

* * * * *